(12) United States Patent
Schweid

(10) Patent No.: US 7,483,591 B2
(45) Date of Patent: Jan. 27, 2009

(54) IMAGE TRANSFER APPARATUS WITH STREAK REMOVAL SYSTEM

(75) Inventor: Stuart Alan Schweid, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 742 days.

(21) Appl. No.: 10/780,475

(22) Filed: Feb. 17, 2004

(65) Prior Publication Data

US 2005/0179953 A1 Aug. 18, 2005

(51) Int. Cl.
*G06K 9/36* (2006.01)

(52) U.S. Cl. .................. 382/289; 382/151; 382/191; 358/488; 358/496

(58) Field of Classification Search ............ 382/138, 382/139, 140, 289, 291, 151, 216, 293, 295, 382/206; 358/505, 474, 488, 496, 493
See application file for complete search history.

(56) References Cited

U.S. PATENT DOCUMENTS

| | | | | |
|---|---|---|---|---|
| 5,169,140 A * | 12/1992 | Wenthe, Jr. | .................. | 271/228 |
| 5,172,907 A * | 12/1992 | Kalisiak | .................. | 271/227 |
| 5,214,470 A * | 5/1993 | Denber | .................. | 355/75 |
| 5,677,776 A * | 10/1997 | Matsuda et al. | .................. | 358/475 |
| 5,949,901 A * | 9/1999 | Nichani et al. | .................. | 382/149 |
| 5,956,161 A * | 9/1999 | Takashimizu et al. | .................. | 358/496 |
| 5,956,435 A * | 9/1999 | Buzug et al. | .................. | 382/283 |
| 6,035,072 A * | 3/2000 | Read | .................. | 382/275 |
| 6,059,284 A * | 5/2000 | Wolf et al. | .................. | 271/227 |
| 6,088,121 A * | 7/2000 | Baumann | .................. | 358/1.18 |
| 6,124,950 A * | 9/2000 | Honda | .................. | 358/474 |
| 6,155,561 A * | 12/2000 | Mandel | .................. | 274/254 |
| 6,282,326 B1 * | 8/2001 | Lee et al. | .................. | 382/289 |
| 6,415,064 B1 * | 7/2002 | Oh | .................. | 382/289 |
| 6,718,071 B2 * | 4/2004 | Yoshida et al. | .................. | 382/289 |
| 6,728,008 B1 * | 4/2004 | Kamisuwa | .................. | 358/474 |
| 6,912,325 B2 * | 6/2005 | Rombola et al. | .................. | 382/289 |
| 7,027,666 B2 * | 4/2006 | Rudak et al. | .................. | 382/289 |
| 7,133,573 B2 * | 11/2006 | Brugger et al. | .................. | 382/289 |

* cited by examiner

*Primary Examiner*—Yosef Kassa
(74) *Attorney, Agent, or Firm*—Perman & Green, LLP

(57) ABSTRACT

An image transfer apparatus for transferring an image on a sheet medium having a frame and a reader connected to the frame for reading the image on the sheet medium. The image moves relative to the reader in a process direction when the reader reads the image. A positioning system is connected to the frame for positioning the sheet medium at a predetermined skew angle relative to the process direction.

27 Claims, 4 Drawing Sheets

IMAGE TRANSFER APPARATUS WITH STREAK REMOVAL SYSTEM

BACKGROUND

1. Field of the Invention

The present invention relates to an image transfer apparatus and, more particularly, to an image transfer apparatus with a streak removal system.

2. Description of Related Developments

Image scanners capture images using sensors such as gray scale sensors or red(R), green(G), and blue(B). For a typical desktop scanner, these sensors could be a single or three row CCD. The sheet medium or image is moved relative to the sensors or the sensors relative to the image in a scanning or process direction while data is being sampled from the sensors. The captured data is recombined digitally to form a full two dimensional image which may be stored, digitally manipulated and/or output to a printer for example. A problem arises when dirt streaks corrupt the image. An example of such a problem is when dirt in the scan path caught between the paper and the scan bar creates thin vertical lines that appear on the scanned image. A further example of such a problem is when dirt in images transfer path is caught between the paper and another surface and creates thin vertical lines that appear on the scanned image. To remove the defect, complex approaches have been employed such as the addition of sensors in the scan head or complex image processing to attempt to detect and remove the streak. Such solutions can be expensive or unreliable and difficult to implement where the image processing algorithm is attempting to distinguish between the streaks and vertical lines that are properly in the scanned image leading to false detection and complex algorithms for avoidance. Accordingly, there is a desire to provide a streak detection and elimination system that is inexpensive, simple and robust.

SUMMARY OF THE EXEMPLARY EMBODIMENTS

In accordance with one exemplary embodiment, an image transfer apparatus for transferring an image on a sheet medium is provided having a frame and a reader connected to the frame for reading the image on the sheet medium. The image is moving relative to the reader in a process direction when the reader reads the image. A positioning system is connected to the frame for positioning the sheet medium at a predetermined skew angle relative to the process direction.

In accordance with another exemplary embodiment, an image transfer apparatus dirt detection system for detecting dirt affecting image transfer quality is provided having a reader capable of reading the image disposed on a medium. The reader has a predetermined process direction for reading the image. A processor is connected to the reader for receiving electronic data embodying the image read by the reader. A skew system is connected to the reader for skewing the image a predetermined angle from an initial orientation to a skewed orientation with the reader reading the image when the image is in the skewed orientation.

In accordance with yet another exemplary embodiment an image transfer apparatus dirt detection system for detecting dirt affecting image transfer quality is provided having a reader capable of reading the image disposed on a medium. The reader has a predetermined process direction for reading the image. A processor is connected to the reader for receiving electronic data embodying the image read by the reader. A positioning system is connected to the reader for positioning the image at a predetermined slant relative to the process direction so that a dirt generated feature included in the electronic data is identifiable by programming of the processor.

In accordance with still yet another exemplary embodiment an image transfer apparatus for transferring an image on a sheet medium is provided having a frame and a reader connected to the frame for reading the image on the sheet medium. A detector is connected to the frame for detecting data, from the electronic data generated by the reader reading the image, that defines a feature in a final output image caused by dirt during reading of the image by the reader.

BRIEF DESCRIPTION OF THE DRAWINGS

The foregoing aspects and other features of the present invention are explained in the following description, taken in connection with the accompanying drawings, wherein.

DETAILED-DESCRIPTION OF THE EXEMPLARY EMBODIMENT(S)

Figure 1:
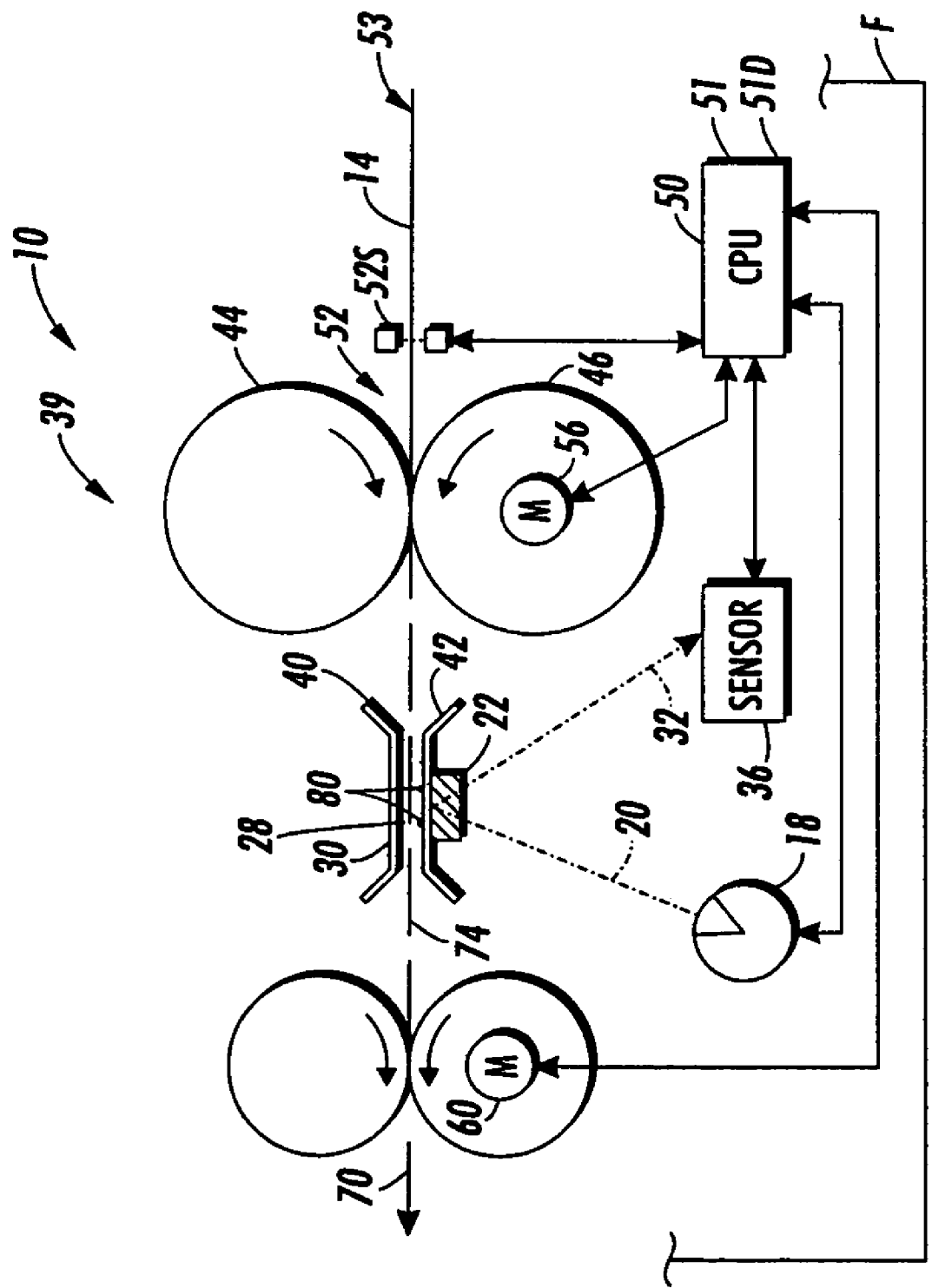
FIG. 1 is a side schematic section view of an image transfer apparatus incorporating features in accordance with an exemplary embodiment.
Figure 2:
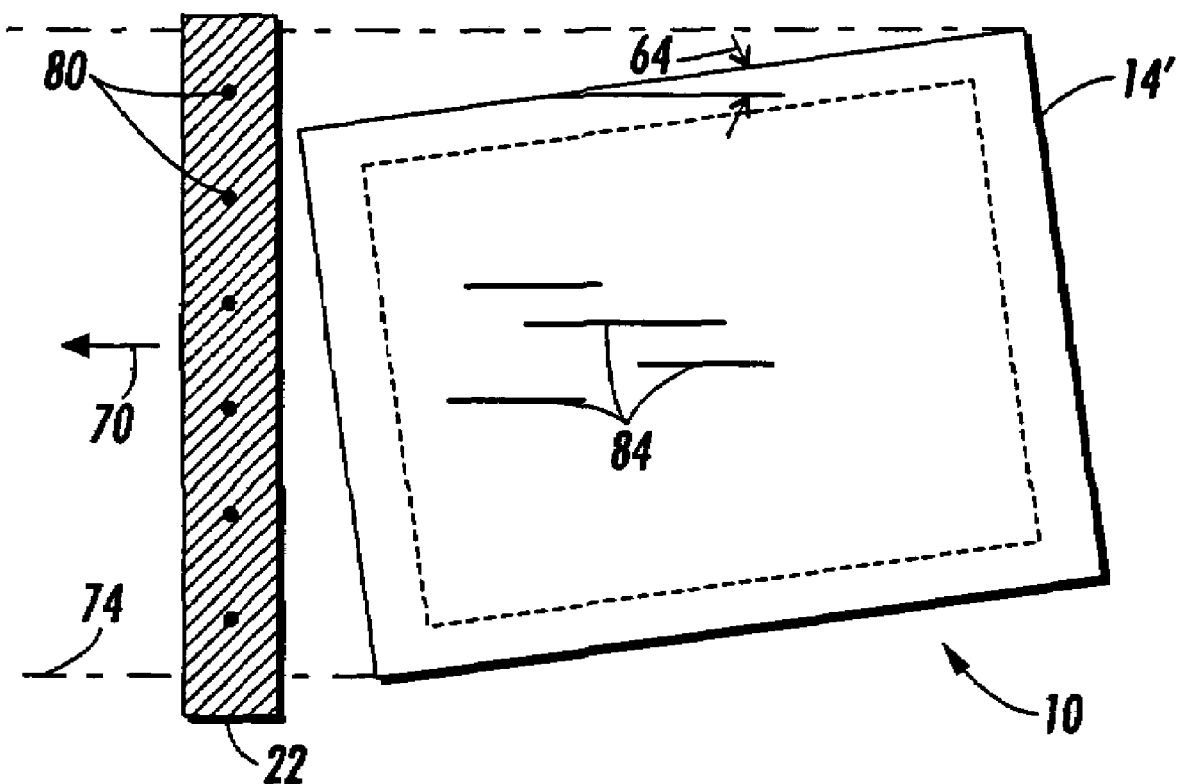
FIGS. 2-2A a respectively a first top schematic section view of a portion of the image transfer apparatus in FIG. 1 showing a document sheet in a skewed position, and a second top schematic section of a transport/skew system of the apparatus with the document sheet in two positions.

Referring to FIG. 1, there is shown a side schematic section view of an image transfer apparatus 10 incorporating features of the present invention in accordance with an exemplary embodiment thereof. Referring also to FIG. 2, there is shown a top schematic section view of a portion of the image transfer apparatus 10. Although the present invention will be described with reference to the exemplary embodiments shown in the drawings, it should be understood that the present invention can be embodied in many alternate forms of embodiments. In addition, any suitable size, shape or type of elements or materials could be used.

Image transfer apparatus 10 may be a conventional scanning system and may be part of any suitable image transfer device such as a copier, scanner or multi-function device. In general, the image transfer apparatus 10 has a frame F (illustrated schematically in FIG. 1) the frame F may define a platen on which an original document (such as sheet or any other suitable kind of media) 14 may be placed to be scanned. An illumination device 18 provides illumination 20 which passes through platen glass 22 so that it is reflected off of (or absorbed by) backing 28 of a document cover 30 as reflected light 32. In alternate embodiments, the light may be reflected off of a roller or ski which supports the document 14 against or in close proximity to the platen glass 22. Platen glass 22 may have an optical system, such as lenses, mirrors, apertures, modulators, dispersion devices or otherwise. This reflected light 32 is sensed by a detector or reader system 36. Detector or reader system 36 may have electronic sensors that convert the light energy into electronic image data. The reader system 36 may have detectors that provide a signal proportional to the irradiance on its active surface and may be a charged couple device (CCD), a full width array sensor (FWA), or other photoelectric device which can operate in a black/white mode or a color mode. When document 14 passes over platen glass 22, reader system 36 may utilize a signal processor that can perform specified functions on the electrical signal to provide the desired output data and can create electric image data, that represents an electronic version of the actual image on the document 14. The signal processor may be integrated into sensor 36 or may be part of controller 50. In this embodiment, the document is moved by transport system 39 over the glass platen to allow the reader to read the image on the document. In alternate embodiments, the document may be stationarily positioned on the platen (which may be made from any suitable materials enabling the reader to view the image) and the reader may be moved to effect reading of the image on the document. In still other alternate embodiments, both the document and the reader may move to effect reading the image.

The transport system 39 may include guides 40 and 42 and any desirable number of rollers 44, 46 (only two rollers are shown for example purposes) forming a drive nip therebetween to guide the original document 14 past the scanning station of platen glass 22. The transport system 30 shown in the embodiment of FIG. 1 is exemplary only, and in alternate embodiments the document transport system may have any other desired configuration such as for example a continuous belt feed system or a roller and, or any other movable document support system. Transport system 39 may have a sheet skewing or deskewing system 52 and/or lateral registration system 53 which may also have various optical sheet lead edge and/or side edge position detector sensors 52 as may be utilized in skewing, deskewing or lateral registration.

Figure 2A:
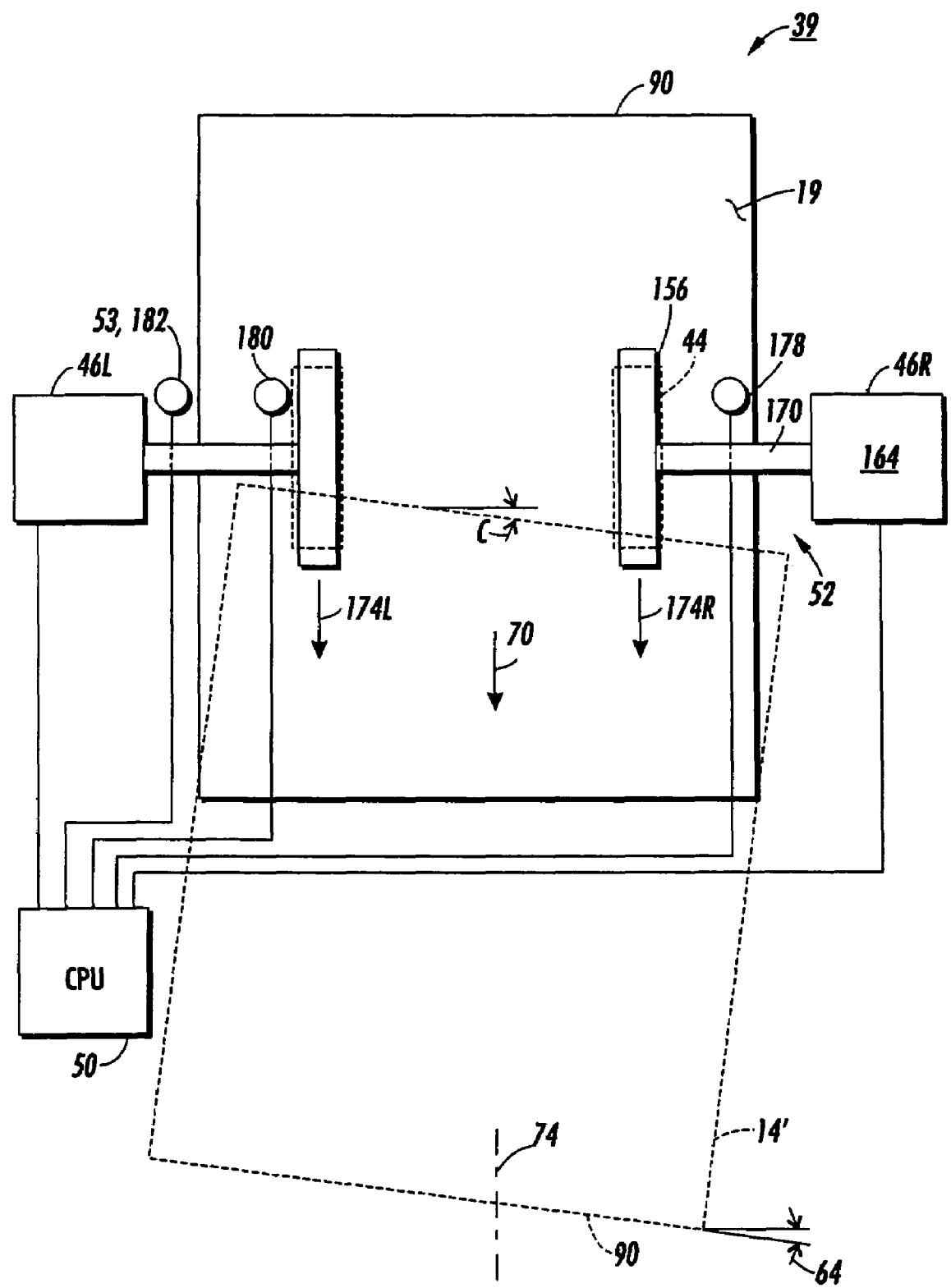

Referring now also to FIG. 2A, there is shown a schematic plan view of a suitable exemplary transport system 39 that may be used in image transfer apparatus 10 to feed the document 14 past reader 36. An example of a suitable skew/deskew system is described in U.S. Pat. No. 6,578,844, issued Jun. 17, 2003, which is incorporated by reference herein in its entirety. The transport 39 generally includes the skew/deskew system 52 that may have for example, first drive 46R and the second drive 46L. First drive 46R and second drive 46L are shown on a common centerline but may alternately have offset centerlines from each other. The first and second drives 46R, 46L may be generally similar but opposite hand and will be described with respect to the first drive 46R. The drive 46R has a first drive roller 156 and a first idler roll generically identified as roller 44 located below drive roll 156. The idler and drive rolls 156, 44 are urged against each other by a suitable bias system (not shown). First drive roll 156 is driven by motor 164. Second controller 50 is connected to motor 164. Controller 50 is shown as a single controller, but may alternately be individual controllers, or logic circuits or part of n overall machine controller. The motor 164 may be directly connected to drive roll 156 with shaft 170 or may be connected to additional drives or drive rolls in addition to first drive roll 56. Through motor 164, controller 50 can vary first drive velocity 174 imparted to a sheet of document by first drive roller 56 either by varying the speed of motor 164, by mechanical speed reduction as with gearing, belt or a clutch, or otherwise. Similarly, the controller 50 can also vary local drive velocity 174L imparted to sheet of document 14 by the roller of second drive 46L. As noted before the transport system further comprises a lateral/skew registration system 53 that may include for example purposes a first sheet sensor 178, second sheet sensor 180 and third sheet sensor 182 (sensor 178, 180 and 182 are represented generically in FIG. 2 as sensors 52S). First sheet sensor 178, second sheet sensor 180 and third sheet sensor 182 may be connected to controller 50 or any other controller. The sensors 178, 180 and 182 could be any type of suitable sensor, such as an optical sensor for example. The sensors 178, 180 and 182 are shown offset from the shafts of the drives 46R, 46L, but may alternately be on the same centerline or further upstream or downstream of drive shafts. The sensors 178, 180 and 182 are shown in line with each other, but may alternately be on the different centerlines further upstream or downstream. Sensors 178, 180 and 182 may be capable of detecting when an edge of sheet of document 14 passes and sends a signal to controller 50. As the sheet of material 14 enters the sheet feeder, it is contacted by the two rolls 156, 44 of the first drive 46R and by the two rolls of the second drive 46L. Sheet of material 14 is advanced by the first drive 46R and the second drive 46L in a direction nominally parallel to the process direction 70 as shown in FIG. 2A.

In the embodiment shown, first sensor 178 and second sensor 180 are positioned to determine the skew angle of sheet of material 14 when it passes through first drive 46R and second drive 46L. As sheet of material 14 enters first drive 46R and second drive 46L it may be moving along the paper path 74 with some initial skew angle (measured from its leading edge 90 to a line perpendicular to paper path 74) determined by the sensors. Phantom position 14' shows skew angle 64 the sheet 14' after it has been skewed by drives 46R, 46L (operating at desired speeds to achieve). For example, controller 50 determines the initial skew angle as a function of the velocity of sheet of material 14 and the time difference between when sheet of material 14 passes over first sensor 178 and second sensor 180. Knowing the initial value of skew angle controller 50 can vary first drive 46R and second drive 46L speeds to adjust skew angle 64 of leading edge 90 of sheet of material 14 to a desired value. Once a desired value for skew angle 64 is obtained, controller 50 can vary first drive velocity and second drive velocity such that they are equal and sheet of material 14 will then continue to be advanced in a direction nominally parallel to the paper path 74. In the embodiment shown, the sheet is skewed clockwise but in alternate embodiments the sheet may be skewed in either direction relative to the paper path 74. In other alternate embodiments, any other suitable transport/skew system may be used to skew the document sheet relative to the process direction, including steerable rollers, or a fluidic cushion bed for example.

Controller or processor 50 interfaces with drive motor(s) 56, 60 and sensor(s) 52S of transport system 39 in order to skew or deskew document or image 14 to a predetermined skew angle 64. Skew angle 64 may be positive or negative. Controller or Processor 50 may also interface with drive motor(s) 56, 60 to transport document or image 14 in a process direction 70 along a path 74. Dirt Streaks may arise in a scanned image when dirt 80 in the scan path is caught between the paper 14 and the scan bar 22 creating thin vertical lines that appear on the scanned image. In this instance, the particles or dirt may not actually create visible streaks on the document 14, but create the streaks in the scanned image as particles 80 block reflected light 32 or incident light 20. A further example of this problem is when dirt in images transfer path is caught between the paper and another surface and creates thin vertical lines 84 that appear on the scanned image. To remove the defect, document 14 is slightly skewed or rotated to a skew angle 64 before it traverses scan head 22. The amount of skew angle 64 may be in the order 10-20 milliradians. In alternate embodiments, other amounts of skew may be used. The actual amount of skew may vary widely about the nominally induced skew. By introducing this known skew, the probability that a vertical line in the scanned image is due to a streak is increased and the probability that a vertical line in the scanned image is due to the actual image is decreased. As a result, a simpler vertical line detection algorithm may be used and the probability of false detection of dirt lines is greatly reduced. Streaks in the scanned image due to dirt or handling may be eliminated in the image processing algorithm 51 (stored in the controller 50) more effectively as a result. Page/image deskew algorithms 510 (also stored in the controller) may then be employed after the streaks are detected and eliminated in order to detect the actual skew of the document and correct for using page skew correction image processing.

Figure 3:
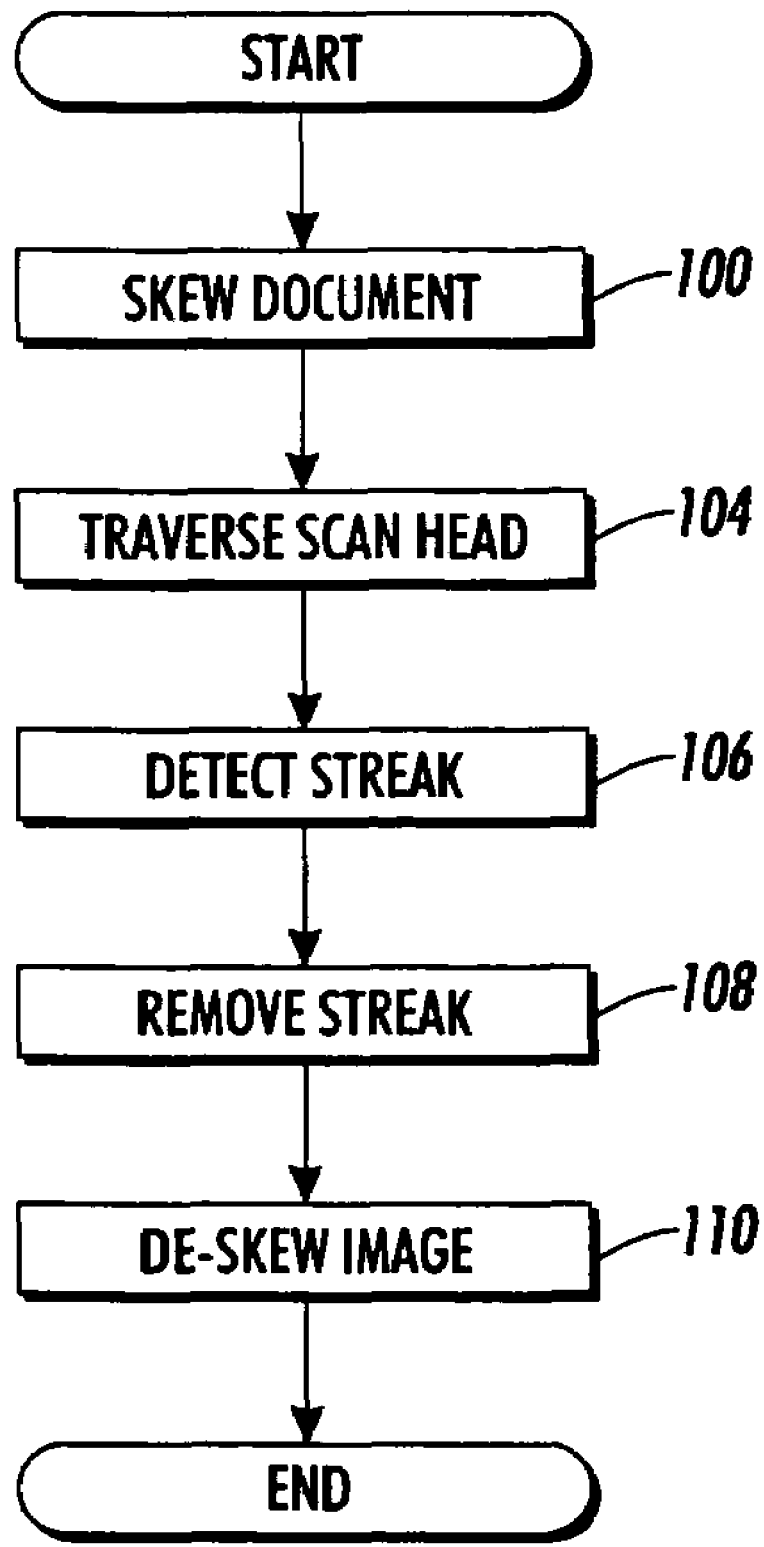
FIG. 3 is a flow chart graphically illustrating an exemplary method in accordance with the present invention.

Referring now to FIG. 3, there is shown a streak removal process flow diagram. In the initial step 100, Document 14 is skewed relative to scan or process direction 70. The amount of skew need not be accurate, but may be set at a predefined minimum, such as 10 milliradians for example; although other minimums may, but need not be defined. The skewed document 14 is then scanned in step 104 by traversing the image or document 14 across scan head 22 in scan or process direction 70. Streaks that are not part of the scanned image are then detected in step 106 by processing the data relating to the scanned image through a streak detection algorithm 51. In such algorithms, methods are used to find vertical lines in the scanned image that correspond to vertical lines in the scan or process direction 70. A Hough Transform is an example of a suitable method of performing such a task although alternate methods may be used. The algorithm must then distinguish these lines into two categories; those it believes were in the original document or image 14 and those it believes are the result of dirt or streaking. In this embodiment, by skewing document 14 by a skew angle 64, the streaks that are not part of the original image or document 14 are vertical or nearly vertical as they occur primarily in the process direction 70 such as when they are due to dirt at a particular position on sensor 22. Lines that appear vertical on the data of the scanned image will actually be at an angle off actual vertical lines of the actual image or document 14 the amount of skew angle 64. As a result, the probability that lines detected as vertical from the skewed image are streaks is much higher than if the image was not skewed. As a result, if a line is detected as vertical from the original scanned data, it is either a dirt streak or a line that is skew angle 64 off of vertical from the original image. As a result, the problem of false detection is greatly reduced. In one embodiment, a skew detection algorithm may be employed that detects, such as with skew system 53 (see FIG. 2A) the actual skew 64 of the document 14. If the detected skew of the captured image is greater than the predefined minimum skew, there will be a low probability of false positive detection of image as dirt streaks. Streaks identified by the streak detection algorithm 51 that are not part of the scanned image are then removed in step 108 by removing and processing the data relating to the streak from the data relating to the scanned image. The resulting data may then be processed through an image deskew algorithm in step 110 to compensate for this skew (i.e. deskew the image). The resulting data represents the original scanned image with the streaks removed. The data may then be output, for example to a printer, (not shown) with the streaks removed and the image not skewed.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An image transfer apparatus for transferring an image on a sheet medium, the apparatus comprising:
a frame;
a reader connected to the frame for reading the image on the sheet medium, the image moving relative to the reader in a process direction when the reader reads the image; and
a positioning system connected to the frame for controllably skewing the sheet medium so that the sheet medium is in a skewed position having a predetermined skew angle relative to the process direction;
wherein, a leading edge of the sheet medium is not perpendicular to the process direction when the sheet medium is at the predetermined skew angle.

2. The apparatus according to claim 1, wherein the sheet medium is positioned at the predetermined skew angle when the reader reads the image on the sheet medium.

3. The apparatus according to claim 1, further comprising a processor connected to the reader for receiving from the reader electronic data embodying the image read by the reader.

4. The apparatus according to claim 3, wherein the processor has programming for detecting the skew angle.

5. The apparatus according to claim 3, wherein the skew angle is established for providing a data portion, of the electronic data, defining a dirt generated feature with a predetermined characteristic indicating that the data portion defines the dirt generated feature.

6. The apparatus according to claim 5, wherein the processor has programming capable of recognizing the predetermined characteristic of the data portion.

7. The apparatus according to claim 5, wherein the predetermined characteristic is that the data portion defines a substantially linear feature oriented in a direction relative to the image read by the reader corresponding to the process direction.

8. The apparatus according to claim 1, wherein the skew angle is larger than a predetermined threshold.

9. The apparatus according to claim 1, wherein the skew angle is between about 10 to 50 mrads.

10. The apparatus according to claim 1, further comprising a processor connected to the reader, the processor being programmed for processing electronic data embodying the image read by the reader so that a final output image is not skewed.

11. An image transfer apparatus dirt detection system for detecting dirt affecting image transfer quality, the system comprising:
a reader capable of reading the image disposed on a medium, the reader having a predetermined process direction for reading the image;
a processor connected to the reader for receiving electronic data embodying the image read by the reader; and
a skew system connected to the reader for controllably skewing the image so that the image is in a skewed position having a predetermined angle relative to the process direction from an initial orientation to a skewed orientation, the reader reading the image when the image is in the skewed orientation;
wherein, a leading edge of the medium is not perpendicular to the process direction when the sheet medium is at the predetermined angle.

12. The apparatus according to claim 11, wherein the processor has programming for detecting dirt generated data in the electronic data from the reader.

13. The system according to claim 11, wherein the initial orientation of the image has a predetermined relationship to the process direction of the reader.

14. The system according to claim 11, wherein the processor has programming for determining the skewed orientation of the image from the electronic data.

15. The system according to claim 11, wherein the processor has programming for processing the electronic data so that a final output image is not skewed.

16. The system according to claim 11, wherein the processor has programming for detecting features defined by the electronic data having a predetermined relation relative to the process direction.

17. The system according to claim 16, wherein the features have a substantially linear shape.

18. The system according to claim 16, wherein the features define at least one line, said line being aligned substantially parallel to an axis of the image corresponding to the process direction.

19. The system according to claim 11, wherein the predetermined angle provide a data portion, of the electronic data, generated by dirt during reading with a predetermined characteristic indicating the data portion is caused by dirt.

20. An image transfer apparatus dirt detection system for detecting dirt affecting image transfer quality, the system comprising:
a reader capable of reading the image disposed on a medium, the reader having a predetermined process direction for reading the image;
a processor connected to the reader for receiving electronic data embodying the image read by the reader; and
a positioning system connected to the reader for controllably skewing the image so that the image is in a skewed position having a predetermined slant relative to the process direction so that a dirt generated feature included in the electronic data is identifiable by programming of the processor;
wherein, a leading edge of the medium is not perpendicular to the process direction when the sheet medium is at the predetermined slant.

21. The system according to claim 20, wherein the slant defines an angle between a vertical axis of the image and the process direction of about 10 to 50 mrads.

22. The system according to claim 20, wherein the dirt generated feature is caused by dirt during reading of the image by the reader.

23. The system according to claim 20, wherein the dirt generated feature is provided with a predetermined characteristic by the slant causing the dirt generated feature to be identifiable.

24. The system according to claim 23, wherein the predetermined characteristic is that a linear portion of the feature is oriented substantially parallel to the process direction.

25. An image transfer apparatus for transferring an image on a sheet medium, the apparatus comprising:
a frame;
a reader connected to the frame for reading the image on the sheet medium;
a positioning system connected to the frame for controllably skewing the sheet medium so that the sheet medium is in a skewed position having a predetermined skew angle; and
a detector connected to the frame for detecting data, from the electronic data generated by the reader reading the image, that defines a feature in a final output image caused by dirt during reading of the image by the reader;
wherein, a leading edge of the sheet medium is not perpendicular to a process direction of the reader when the sheet medium at the predetermined skew angle.

26. The apparatus according to claim 25, wherein the detector comprises a processor connected to the reader to receive the electronic data from the reader.

27. The apparatus according to claim 26, wherein the image moves relative to the reader in the process direction when the reader reads the image.

* * * * *